Feb. 27, 1968   G. C. MAYER   3,370,661
CATCH GATES FOR WEIGHING APPARATUS AND THE LIKE
Filed March 25, 1965   5 Sheets-Sheet 1

INVENTOR
GERALD C. MAYER
BY Norris & Bateman
ATTORNEYS

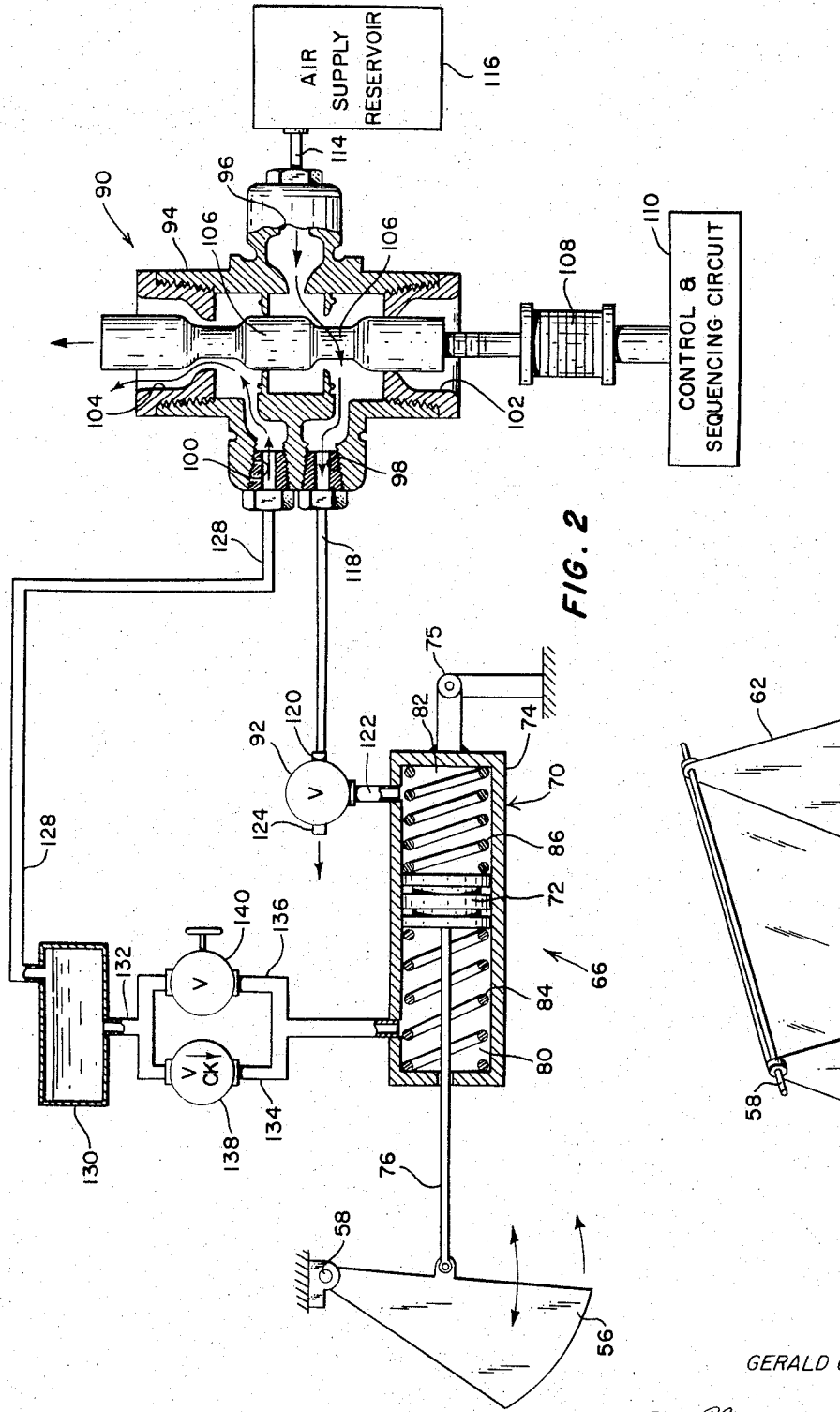

Feb. 27, 1968     G. C. MAYER     3,370,661
CATCH GATES FOR WEIGHING APPARATUS AND THE LIKE
Filed March 25, 1965     5 Sheets-Sheet 3

INVENTOR
GERALD C. MAYER
BY Norris & Bateman
ATTORNEYS

INVENTOR
GERALD C. MAYER

BY Norris & Bateman
ATTORNEYS

Feb. 27, 1968

G. C. MAYER 3,370,661

CATCH GATES FOR WEIGHING APPARATUS AND THE LIKE

Filed March 25, 1965

INVENTOR
GERALD C. MAYER

BY *Morris & Bateman*

ATTORNEYS

United States Patent Office 3,370,661
Patented Feb. 27, 1968

3,370,661
CATCH GATES FOR WEIGHING APPARATUS AND THE LIKE
Gerald C. Mayer, Wayne, N.J., assignor to Howe Richardson Scale Company, Clifton, N.J., a corporation of Delaware
Filed Mar. 25, 1965, Ser. No. 442,639
19 Claims. (Cl. 177—60)

ABSTRACT OF THE DISCLOSURE

The pivotally mounted catch gate disclosed herein for cutting off the flow of material to a beam-supported scale hopper is operated by a mechanism which impresses harmonic motion on the catch gate so that the velocity of the gate as it moves away from its material feed position and towards its material cutoff position reaches a maximum at a position midway between the feed and cutoff positions and then steadily decreases to a zero magnitude in swinging from the mid-position to the cutoff position.

---

This invention relates to gate mechanisms for interrupting flow of material and is particularly concerned with pivotally mounted catch gates for interrupting the flow of fluent or particulate material in a falling stream.

Typically, weighing apparatus of one type to which the present invention relates comprises a fulcrumed weigh beam assembly which is operatively connected to a weigh hopper and a counterweight on opposite sides of the beam fulcrum. Material to be weighed is fed to the hopper in a continuous falling stream, and when the load applied to the hopper approaches a weight that balances out the counterweight, the feed is automatically cut off by a swingable catch gate.

Conventional catch gates are typically pivotally mounted for swinging movement between a feed position where the gate is out of the path of the material descending into the scale hopper and a cutoff position where the gate is swung to interrupt the flow of material into the scale hopper. In batch weighing systems and the like, such catch gates are required to be rapidly closed by motive power in response to a weight-responsive signal to quickly cut off the material feed to the weigh hopper so that excess material does not enter the hopper during the interval between the generation of the cutoff signal and the movement of the catch gate to its cutoff position. To stop the rapidly moving gate when it reaches its cutoff position, rigid stops, mechanical catches, and shock absorbers are conventionally used in varying combinations.

By abruptly stopping the movement of the gate with rigid stop abutment surfaces, objectionable vibrations are imposed on the weighing apparatus to adversely affect the accuracy of the weighing cycle at its cutoff stage which is especially critical in obtaining accurate weighments. In addition, the shock resulting from bringing the catch gate to an abrupt stop frequently results in damage and breakage to the gate assembly and also to the mechanism used to impart movement to the gate. To reduce vibration and damage to the parts of the apparatus owing to the shock of closing the gate, shock absorbers have been previously employed, but were found not to be a satisfactory solution. In addition, mechanical catches are usually required to prevent the gate from bouncing back to an opened or feeding position.

Accordingly, a primary object of this invention is to provide a novel catch gate mechanism which eliminates the foregoing problems.

More specifically, it is an object of this invention to provide a novel catch gate mechanism which imparts to the catch gate harmonic motion so that the velocity of the gate continuously increases as it moves from its feed position to a mid-position, reaches its maximum velocity at the mid-position, and then steadily decreases to a zero magnitude in moving from the mid-position to the cutoff position.

The catch gate mechanism constructed according to this invention has the following advantages:

(1) A noiseless shockless closing of the catch gate to enable weighing apparatus to operate faster and more accurately by eliminating a significant source of vibration.

(2) A lighter, less expensive construction of the catch gate, the structure for swingably mounting the catch gate, and the mechanism for actuating the catch gate.

(3) The elimination of shock absorbers, stops, and mechanical catches.

Another object of this invention is to provide a novel gate actuating mechanism having a fluid motor into which liquid, such as oil, for example, is introduced to serve as a cushion for preventing the catch gate from swinging back from its cutoff position.

Still another object of this invention is to provide a novel overcenter toggle lock mechanism for releasably latching a catch gate in its opened, feeding position and its closed cutoff position.

A further object of this invention is to provide a novel latch mechanism for releasably preventing a catch gate from swinging back from its cutoff position toward its feed position.

Further objects of this invention will appear as the description proceeds in connection with the appended claims and the annexed drawings wherein:

FIGURE 2 is a partially diagrammatic elevation of the catch gate mechanism shown in FIGURE 1 and constructed in accordance with the principles of this invention;

FIGURE 3 is a perspective view of the catch gate shown in FIGURE 1;

In its preferred embodiment, the invention will be described as employed in a batch weighing apparatus having a motor driven material feeding mechanism. It will be appreciated, however, that this invention is also applicable to weighing machines of other forms in addition to other material transfer apparatus, as well as apparatus transferring material by gravity.

Figure 1:
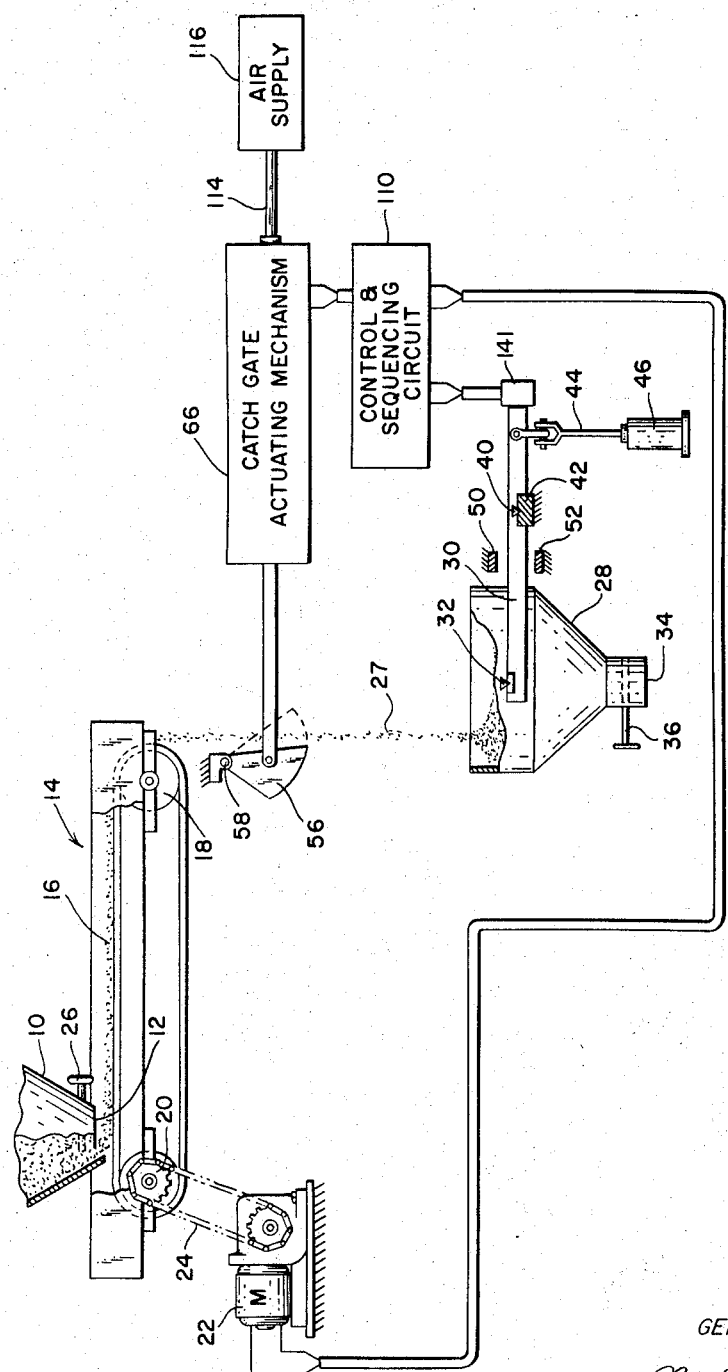
FIGURE 1 is a diagrammatic view illustrating a batch weighing apparatus incorporating a preferred embodiment of the present invention.

Referring now to the drawings and more particularly to FIGURE 1, the batch weighing apparatus incorporating this invention comprises a storage hopper 10 having an open bottom 12 for discharging fluent or particulate material in a layer upon an endless belt, power driven feeder 14 of conventional construction. Feeder 14 has an upper belt flight 16 which is horizontal and which moves from left to right in FIGURE 1 between pulleys 18 and 20. An electric motor 22 drive connected to pulley 20 by an endless chain 24 drives pulleys 18 and 20 at the same constant speed. A discharge gate 26 may be provided to control delivery of material from storage hopper 10 to feeder 14.

The material passing through the open bottom 12 of hopper 10 is advanced in a layer on the upper flight 16 of feeder 14. This material falls off the end of the flight as it passes around pulley 18 and descends in a freely falling continuous column 27 directly into a weigh hopper 28. In this embodiment, hopper 28 is supported from a free weigh beam 30 by a suitable knife edge and load bearing assembly indicated at 32. The bottom of hopper 28 has an opening 34 which is provided with a discharge gate 36. Discharge gate 36 may be opened and closed by a suitable unshown fluid motor.

Still referring to FIGURE 1, weigh beam 30 is fulcrumed to the right of knife edge assembly 32 by a suitable pivot assembly comprising a knife edge 40 which is fixed to beam 30 and which is seated on a fixed knife edge bearing 42 to provide a horizontal fulcrum axis for beam 30. A rod 40 carrying a counterweight 46 to balance hopper 28 and the material therein is pivotally suspended from the free end of beam 30 at a distance spaced to the right of the beam fulcrum axis 40, 42 to provide suitable leverage.

As shown in FIGURE 1, weigh beam 30 is freely swingable about its fulcrum axis between upper and lower closely spaced relatively fixed stops 50 and 52 and occupies a static position between the stops when a predetermined weight in hopper 28 counterbalances weight 46. Preferably, beam 30, hopper 28, and feeder 14 are mounted in a suitable casing which is not shown.

With continuing reference to FIGURE 1, a pivotally mounted, radial catch gate 56 is interposed between feeder 14 and the open top of weigh hopper 28. Catch gate 56 is pivotally supported from a rod 58 and, as shown in FIGURE 3, typically comprises a pair of parallel spaced apart side walls 60 and 62 which are rigidly joined together by a curved bottom wall 64. Catch gate 56 is swingable about the axis of rod 58 between a feeding position shown in solid lines in FIGURE 1 where it is out of the path of the material in stream 27 and a cutoff position shown in dotted lines where it is swung into the path of the stream 27 of material descending into weigh hopper 28. The apparatus thus far described is conventional.

In accordance with this invention, a mechanism 66 for swinging gate 56 between its feed and cutoff positions is shown to comprise a fluid motor 70 having a piston 72 coaxially slidable in a suitable cylinder 74 and connected by an axially aligned piston rod 76 to catch gate 56. At one end, cylinder 74 is mounted on a fixed support by a pivot connection 75. Rod 76 is rigid with piston 72 and is pivotally connected to catch gate 56 along an axis extending at right angles to the swing axis of catch gate 56 about rod 58. In this embodiment, the swing axis of catch gate 56 is shown to be horizontal so that catch gate 56 is essentially swingable in a vertical plane. Cylinder 74 is formed with a smooth internal cylindrical wall and is divided by piston 72 into axially spaced apart, expansible chambers respectively indicated at 80 and 82. Coaxially mounted in chambers 80 and 82 respectively are a pair of oppositely acting helically coiled, compression springs 84 and 86 which react against opposed, internal end faces of cylinder 74 to engagingly urge piston 72 to a centered position shown in FIGURE 2. Preferably, the diameters of springs 84 and 86 are closely equal to the inside diameter of cylinder 74. Springs 84 and 86, as will be described in greater detail later on, are of the same construction and have the same spring constant to provide gate 56 with a harmonic motion in swinging from its opened feed position to its closed, cutoff position so that the velocity of the gate when it reaches its cutoff position is shocklessly reduced to zero.

When catch gate 56 is midway between its opened, feeding position and its closed, cutoff position, piston 72 is midway between the limits of its opening and closing strokes. In this equilibrium position, springs 84 and 86 are compressed slightly more than half the piston strokes so that they remain in contact with piston 72 and the opposed internal end faces of cylinder 74 during the opening and closing piston strokes. When catch gate 56 is in its opened, feeding position shown in full lines in FIGURE 1, spring 84 on the left-hand side of piston 72 as viewed from FIGURE 2, is compressed slightly more than the piston stroke. When catch gate 56 is moved to its closed, cutoff position, spring 84 extends and spring 86 on the opposite side of piston 72 is compressed slightly more than the piston stroke.

Still referring to FIGURE 2, pressurized air or other fluid is supplied to and exhausted from chamber 82 under the control of a four-way valve 90 and a quick-exhaust exhaust valve 92. Valve 90 may be of any suitable, conventional form and essentially comprises a housing 94 having a supply port 96, a pair of axially spaced apart cylinder ports 98 and 100, and a pair of oppositely facing exhaust ports 102 and 104. A valve member 106 mounted in housing 94 for controlling flow of fluid through housing 94 is slidably shiftable to a first operative position shown in FIGURE 2 where fluid communication is established between supply port 96 and cylinder port 98 and also between exhaust port 104 and cylinder port 100. In this first operative position, valve member 106 cooperates with valve seats in housing 94 to close exhaust port 102 and to open exhaust port 100 as shown.

From the position of parts shown in FIGURE 2, valve member 106 is shiftable upwardly to a second operative position where fluid communication is established between supply port 96 and cylinder port 100 and also between cylinder port 98 and exhaust port 102. In this second operative position, exhaust port 102 is opened and exhaust 104 is closed. One suitable four-way valve construction of the type just described is the Versa Valve Model VKP-4322. In this embodiment, valve member 106, as shown in FIGURES 1 and 2, is shifted between its two operative positions described above by a solenoid operator 108 which may be energized and de-energized by a conventional control and sequencing circuit 110.

With continuing reference to FIGURE 2, supply port 96 is connected by a fluid flow conduit 114 to a suitable pressurized air supply reservoir 116. Cylinder port 98 is connected by a fluid flow conduit 118 to an inlet port 120 of valve 92. Valve 92 has a cylinder port 122 which is connected to cylinder 74 in fluid communication with chamber 82. Valve 92 may be of any suitable, conventional quick-exhaust type which contains an unshown check valve element for controlling flow of fluid between ports 120 and 122 and also between port 122 and an exhaust port 124. With this type of quick exhaust valve, the check valve element is operative such that when fluid pressure is present in conduit 118, exhaust port 124 is closed and fluid communication is established between inlet port 120 and cylinder port 122. When pressurized fluid in conduit 118 is exhausted as by shifting valve member 106 to its second operative position for establishing fluid communication between cylinder port 98 and exhaust port 102, the check valve element in valve 92 is shifted by fluid pressure in chamber 82 to open exhaust port 124 and to block fluid communication between ports 120 and 122.

One suitable, quick exhaust valve of the type just described is Model No. 3340 manufactured by Schroeder & Son.

From the foregoing construction it will be appreciated that when valve member 106 is shifted to its first operative position shown in FIGURE 2, pressurized air from reservoir 116 is furnished to conduit 118. The pressure of the air in conduit 118 operates valve 92 to close port 124 and to establish fluid communication between ports 120 and 122 for introducing the pressurized air into chamber 82 to urge piston 72 to the left in a gate-opening direction as viewed from FIGURE 2.

With continued reference to FIGURE 2, cylinder port 100 is shown to be connected by a fluid flow conduit 128 to the top of an enclosed chamber comprising an oil reservoir 130. Reservoir 130 is provided with a bottom port 132 which is connected by a pair of fluid flow conduits 134 and 136 to chamber 80. A check valve 138 and an orifice flow control valve 140 are respectively disposed in conduits 134 and 136. Oil or other suitable liquid is contained in reservoir 130, and flow of liquid between chamber 80 and reservoir 130 is controlled by check valve 138 and orifice valve 140. Check valve 138 permits fluid flow from reservoir 130 to chamber 80, but blocks flow of fluid through conduit 134 from chamber 80 to reservoir 130. With this arrangement, oil from reservoir 130 flows through both conduits 134 and 136 into chamber 80. In exchanging oil from chamber 80, however, fluid flow through conduit 134 is blocked, thus permitting the oil to flow only through conduit 136 under the control of valve 140 for a purpose that will become apparent as the description proceeds.

In operation of the system just described, a beam mounted switch assembly 141 is actuated by movement of beam 30 in response to the delivery of a predetermined amount of material to weigh hopper 28. Actuation of switch assembly 141 conditions circuit 110 to deenergize motor 22 for stopping feeder 14 and for simultaneously conditioning solenoid operator 108 for shifting valve member 106 of valve 90 to its previously described, second operative position. Control circuit 110 and switch assembly 141, which may be conventional, preferably are of the form described in copending application Ser. No. 327,280 filed in the U.S. Patent Office on December 2, 1963 for Weighing Apparatus. Since the details of this circuit are not essential for a complete understanding of the present invention, however, it will not be described further.

When catch gate 56 is in its opened, feeding position, piston 72 is moved to the left-hand limit of its stroke to compress spring 84 by slightly more than the piston stroke. When solenoid operator 108 is conditioned by circuit 110 to shift valve member 106 to its second operative position for exhausting pressurized air from conduit 118 and supplying pressurized air to reservoir 130 through conduit 128, pressurized air in chamber 82 is exhausted through valve 92 with the result that spring 84 is permitted to release its stored energy to urge piston 72 towards the right-hand end of cylinder 74 as viewed from FIGURE 2, thereby swinging catch gate 56 towards its closed, cutoff position. As chamber 80 expands by moving piston 72 under the bias applied by spring 84, oil is supplied to chamber 80 through conduits 134 and 136 by the air pressure furnished to reservoir 130 through conduit 128.

In accordance with this invention, the amount of oil entering chamber 80 as it expands is just enough to keep the expanding chamber space filled so that the oil within chamber 80 acts as a cushion against reverse movement of piston 72 and essentially applies no pressure to shift piston to the right-hand end of cylinder 74 for closing catch gate 56. Thus, the motion imparted to catch gate 56 in swinging it from its opened, feeding position to its closed, cutoff position is controlled only by springs 84 and 86, and the only force exerted for accelerating catch gate 56 to move it towards its closed, cutoff position is provided by spring 84.

As piston 72 moves to the right in FIGURE 2, it forces air out of chamber 82 through valve 92 and compresses spring 86. Compression of spring 86 produces a steadily increasing force opposing the movement of piston 72 under the bias exerted by spring 84 with the result that the accelerating force exerted by spring 84 is steadily diminished. Piston 72 thus moves under the bias exerted by spring 84 from the extreme left-hand end of its stroke to swing catch gate 56 forwardly from its opened, feeding position. The velocity of piston 72 and, consequently, catch gate 56 as piston 72 moves from its left-hand position towards its centered position shown in FIGURE 2 continuously increases from zero velocity as shown by curve 143 in the velocity diagram illustrated in FIGURE 4. When piston 72 reaches its illustrated centered position, catch gate 56 is midway between its opened, feeding position and its closed, cutoff position and springs 84 and 86, at this point, exert equal and opposite forces on piston 72. As a result, acceleration of piston 72 and, consequently, catch gate 56 reduces to zero. As piston 72 moves past its mid position, the increasing force exerted by increasingly compressing spring 86 becomes greater than the opposing force exerted by spring 84 with the result that piston 72 and, consequently, catch gate 56 being to deaccelerate. Thus, maximum velocity of piston 72 and catch gate 56 is reached when catch gate 56 is midway between its opened, feeding position and its closed, cutoff position where springs 84 and 86 exert equal, but opposing forces on piston 72.

Figure 4:
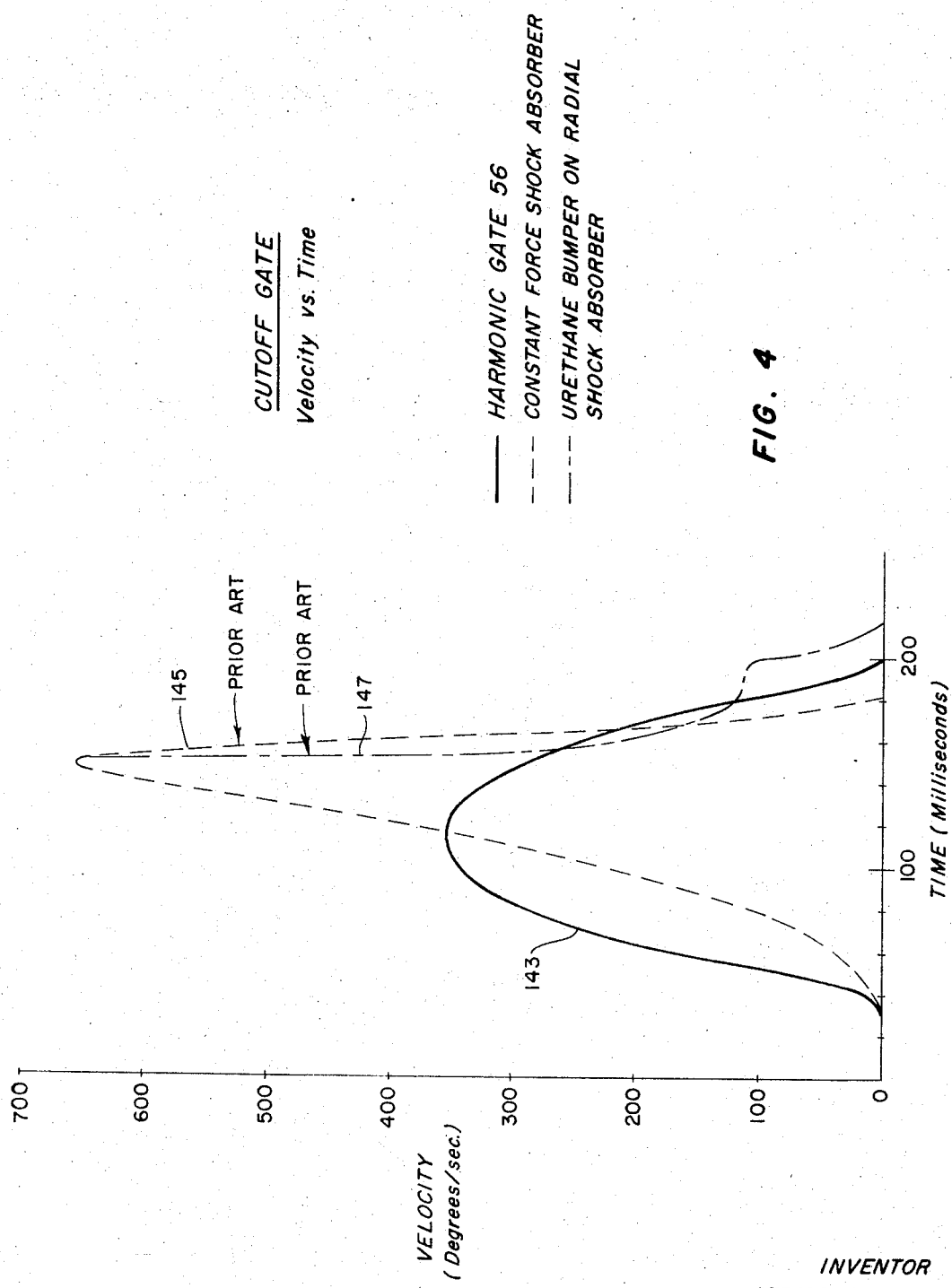
FIGURE 4 is a graph of the velocity pattern imparted to the catch gate by the mechanism of this invention as compared with the velocity patterns for two conventional forms of mechanisms.

As a result of increasingly compressing spring 86, the velocity of piston 72 and, consequently, catch gate 56, owing to the momentum of the moving parts, continuously decreases as shown in FIGURE 4 until the velocity of piston 72 becomes zero under the increasing bias exerted by spring 86.

From the foregoing it will be appreciated that springs 84 and 86 so control the displacement of piston 72 that harmonic motion is imparted to catch gate 56 in swinging it from its opened, feed position to its closed, cutoff position. This harmonic, catch gate motion is comparable with a swing which moves back and forth between high points raised above the ground. When the swing reaches its high points, it stops momentarily and shocklessly and then reverses direction.

Thus, with the present invention, the velocity pattern represented by curve 143 and imparted to gate 56 by springs 84 and 86 as gate 56 swings from its opened, feeding position to its closed, cutoff position is in the form of a half of a sine wave having zero velocity at the beginning and the end of the catch gate travel and maximum velocity midway between the points where the velocity of gate 56 is at zero velocity. Since the energy stored in spring 84 and the momentum of moving parts in moving gate 56 to its closed position is completely expended by the time gate 56 reaches its closed, cutoff position, no stops are required and no shocks are encountered.

As a result of noiselessly and shocklessly closing gate 56, objectionable vibrations of the weighing apparatus are eliminated to allow beam 30 to more quickly stabilize at its static balancing position. In batch or checkweighing operations, therefore, the number of weighings can thus be increased. Test results demonstrate that the present invention allows at least three to four additional weighings to be made per minute in comparison with conventional weighing machines which are subject to shock and resulting vibration caused by abruptly stopping the catch gate when it reaches its fully closed position.

Even the conventional employment of constant force shock absorbers and shock bumpers do not compare favorably with the present invention as shown by the prior art curves designated at 145 and 147 in FIGURE 4. To obtain the data for curve 145, the present invention was replaced with a constant force shock absorber. To obtain the data for curve 147, the present invention was replaced with a urethane bumper on a radial shock absorber. In both cases the gate was closed by a fluid motor, and it is clear that the decrease in velocity reflected by curves 145 and 147 is considerably more abrupt. In addition, considerably higher peak velocities were reached at a time appreciably following the period at which the gate of this invention reaches maximum velocity.

Another advantage of shocklessly closing gate 56 in accordance with this invention is that the fluid motor and gate parts can be made considerably lighter since there is no abrupt change in momentum and no vibrations are encountered in bringing the gate to a stop at its cutoff position. The weight reduction of gate 56 in this invention in turn reduces the acceleration forces even further to thus provide a two-fold stress reduction for promoting longer life of gate mechanism. In addition, stops, bumpers, and shock absorbers are not required.

By supply oil to chamber 80 as it expands when piston 72 moves to the right in FIGURE 2, an incompressible liquid cushion backed by a compressible air cushion is provided to prevent oscillations from occurring owing o the compression and expansion of springs 86 and 84 respectively. The air pressure acting on the oil in reservoir 130 thus holds catch gate 56 in its fully closed cutoff position. To open gate 56 for permitting material to flow into hopper 28, valve member 106 is shifted to its first operative position illustrated in FIGURE 2 to allow pressurized air to enter chamber 82 for urging piston 72 to the left as viewed from FIGURE 2. At the same time, the fluid in conduit 128 and reservoir 130 is exhausted through exhaust port 104 to relieve the air pressure applied to the oil in chamber 80. Displacement of piston 72 to the left in swinging gate 56 to its opened position thus forces the oil out of chamber 80 and into reservoir 130. Valve 140 is adjusted to provide a desired slow opening of gate 56.

From the foregoing it will be appreciated that springs 84 and 86 do not control the opening of gate 56, and mechanism 66 acts substantially as a hydraulic device to move the gate to its opened position shown in FIGURE 1. The air pressure applied to piston 72 holds gate 56 in its opened position. With this invention no catch gate stops are required since air pressure and spring force control the distance piston 72 travels.

Figure 6:
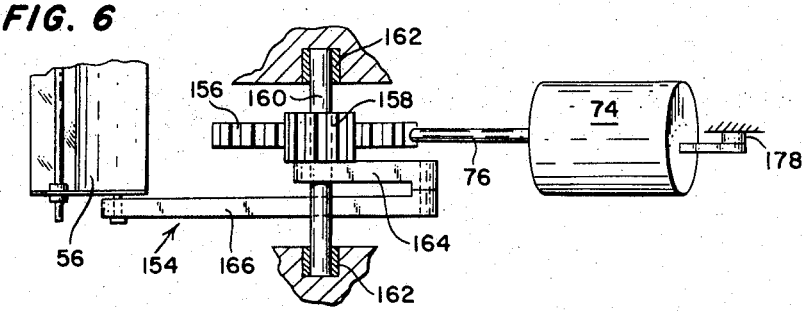
FIGURE 6 is a top plan view of the mechanism shown in FIGURE 5.
Figure 5:
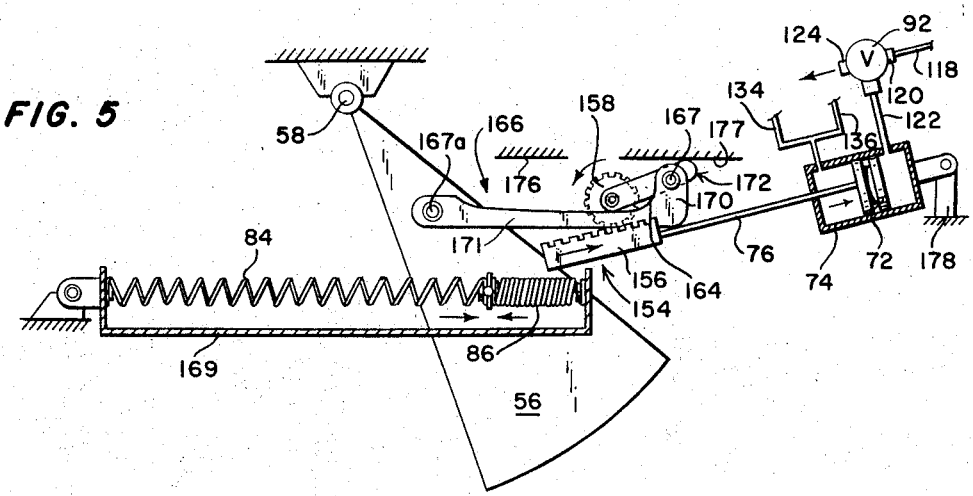
FIGURE 5 is a partially diagrammatic elevation of a catch gate mechanism constructed according to another embodiment of this invention and showing the catch gate in its closed, cutoff position.
Figure 7:
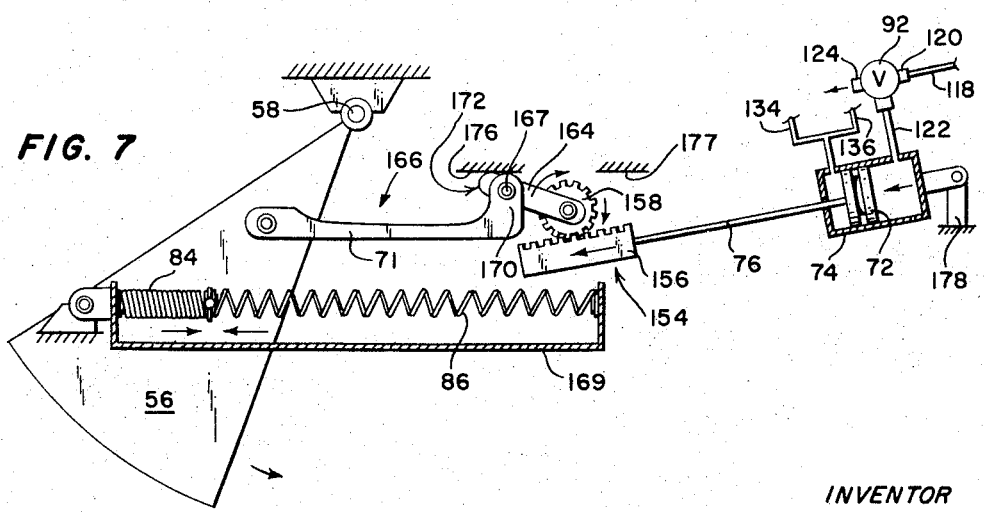
FIGURE 7 is a view similar to FIGURE 5, but showing the catch gate in its opened, feeding position.

FIGURES 5-7 illustrate another embodiment of this invention wherein springs 84 and 86 are removed from cylinder 74 and connected directly to catch gate 56 and wherein piston rod 76 is connected to catch gate 56 by a rack and pinion assembly 154. To the extent that the embodiments respectively shown in FIGURES 5-7 and 1-3 are alike, like reference numerals have been used to designate like parts.

Assembly 154, as shown in FIGURES 5-7, comprises a rack 156 rigidly fixed to rod 76 and meshing with a pinion 158 which is coaxially fixed on a shaft 160. Shaft 160 is journalled at opposite ends in suitable bearings indicated at 162 (see FIGURE 6) and is rotatable about an axis extending parallel to the swing axis of gate 56 and at right angles to the longitudinal axis of piston 72. A link 164 fixed on shaft 169 is pivotally connected at a distance radially spaced from shaft 160 to one end of a further link 166 by a pin 167. The other end of link 166 is pivotally connected by a pin 167a to gate 56.

With continuing reference to FIGURES 5 and 7, springs 84 and 86 are mounted in axial alignment on a fixed, rigid bracket 169 and have their adjacent opposed ends engaging gate 56 in the manner shown. The opposite ends of springs 84 and 86 are secured to opposed end faces of bracket 169 to thus react against bracket 169 for applying axially aligned, opposed forces on gate 56.

Link 166, as best shown in FIGURES 5 and 7, is formed with a pair of rigid right angular arms 170 and 171 which are respectively pivotally secured to link 164 and to catch gate 56. With this construction, link 166 co- operates with link 164 to provide an overcenter toggle mechanism indicated generally at 172.

In the opened, feed position of gate 56 shown in FIGURE 7, toggle mechanism 172 is swung to one overcenter locking position where pivot pin 167 is displaced vertically above a line intersecting the axes of pivot pin 167a and shaft 160. In this position, link 164 bears against a fixed downwardly facing stop surface 176 to limit further clockwise rotation of pinion 158 as viewed from FIGURES 5 and 7. In this position of gate 56, spring 84 is compressed and spring 86 is extended as previously described. Thus, to swing catch gate 56 to its closed, cutoff position shown in FIGURE 5, valve 90 is actuated to supply fluid pressure to the oil in chamber 130 and to exhaust pressure fluid from conduit 118 in the manner previously explained. The initial delivery of oil into chamber 80 by the air pressure supplied through conduit 128, piston 72 is shifted to the right in FIGURE 7 to rotate pinion 158 in a counterclockwise direction as viewed from FIGURE 7 to break the overcenter lock provided by toggle mechanism 172. Thereafter, spring 84 which was compressed when gate 56 was swung to its opened position illustrated in FIGURE 7 is able to release its stored energy for swinging gate towards its closed, cutoff position shown in FIGURE 5. After toggle mechanism 172 is unlocked, spring 84 applies substantially the sole accelerating force for moving gate 56.

As gate 56 is swung in a counterclockwise direction as viewed from FIGURES 5 and 7, link 166 is shifted forwardly to swing link 164 in a counterclockwise direction, thereby rotating shaft 160 and pinion 158.

When gate 56 reaches an intermediate position substantially midway between its fully opened and fully closed positions, springs 84 and 86 apply equal, but opposing forces on gate 56 to thereby reduce the accelerating force to substantially zero. Thereafter, gate 56 in moving through its intermediate position midway between fully closed and fully opened positions, begins to continuously de-accelerate in the manner previously explained until spring 86 has been compressed sufficiently to reduce the gate velocity to substantially zero. At this point, gate 56 has reached its fully closed, cutoff position illustrated in FIGURE 5 where link 164 has been swung around to extend generally in the opposite direction from the position illustrated in FIGURE 7. In the closed gate position shown in FIGURE 5, pivot pin 167 is again disposed above a line intersecting the axes of pin 167a and shaft 164 to establish a further overcenter lock in the manner previously explained for locking mechanism 172 when gate 56 was in its opened, feed position. A stop 177 may be provided to limit counterclockwise movement of link 164. Cylinder 74 preferably is mounted for limited pivotal movement on a fixed support 178.

Figure 9:
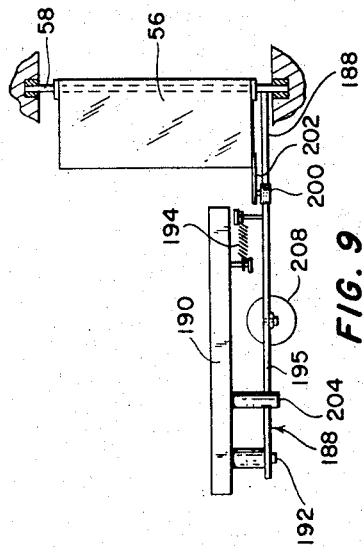
FIGURE 9 is a fragmentary top plan view of the mechanism shown in FIGURE 8.
Figure 8:
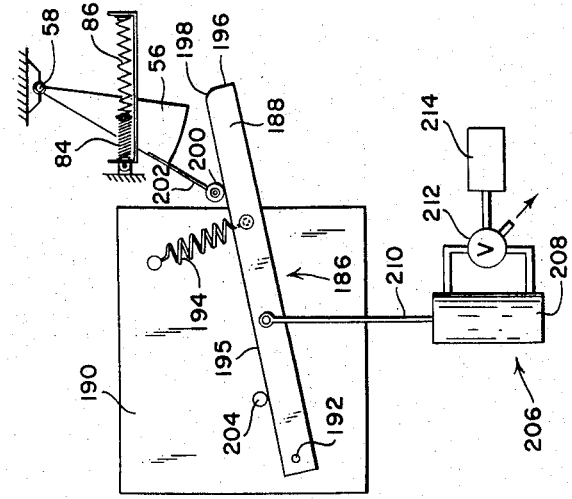
FIGURE 8 is a partially diagrammatic elevation of a catch mechanism constructed according to still another embodiment of this invention and showing the catch gate in its opened, feeding position.

Referring now to FIGURES 8 and 9, a latching mechanism 186 for releasably retaining catch gate 56 in its closed, cutoff position is shown to comprise a rigid latch 188 comprising a bar which is pivotally secured to a stationary support plate 190 by a pin 192. The longitudinal pivot axis of pin 192 is parallel to the swing axis of gate 56.

With continued reference to FIGURES 8 and 9, latch 188 is resiliently biased in a counterclockwise direction about the axis of pin 192 by a helically coiled spring 194 having one of its ends secured to support plate 190 and the other of its ends secured to latch 188 at a distance spaced radially from pin 192. Latch 188 is formed with a planar top face 195 extending to its right-end and is joined to a perpendicular end face 196 by a smoothly curved portion 198.

A roller 200 mounted by a rigid member 202 is engageable with top face 195. Member 202 is fixed to catch gate 56 to move roller 200 back and forth along the top face of latch 188 when catch gate 56 is swung between its opened and closed positions.

As shown in FIGURE 8, roller 200 depends from catch gate 56 and engages the top surface of latch 188 below gate 56. In this position of parts, gate 56 is opened and spring 194 biases latch 188 upwardly into engagement with a stop 204 which is fixed to plate 190. With gate 56 in its opened position spring 84 is compressed and spring 86 is extended to a substantially relaxed condition.

To retain gate 56 in its opened position a fluid motor 206 is operatively connected to latch 188 and comprises a cylinder 208 which slidably receives an unshown double-acting piston. A piston rod 210 fixed to the unshown piston in cylinder 208 is pivotally connected to latch 188 between pin 192 and the connection of spring 194. A suitable 3-way valve 212 is actuatable to control delivery and exhaust of pressurized motor operating fluid to opposite ends of cylinder 208 on opposite sides of the unshown piston. Valve 212 may be advantageously actuated by a solenoid operator 214.

When gate 56 is in its opened, feed position shown in FIGURE 8, fluid pressure in motor 206 urges latch 188 into its upwardly inclined position in engagement with stop 204. Roller 200 engages top face 195, and spring 84, which is compressed, applies a downward biasing force to latch 188 through member 202. To swing gate 56 to its closed, cutoff position, valve 212 is actuated to release the fluid pressure in cylinder 208, thereby allowing spring 84 to pivot latch 188 in a clockwise direction against the bias exerted by spring 194.

Figure 11:
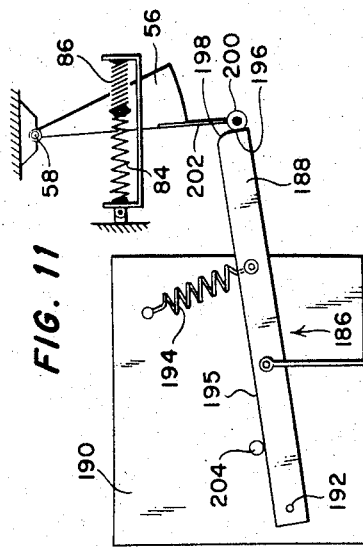
FIGURE 11 is a view similar to FIGURE 8, but showing the parts of the mechanism in positions corresponding to the closed position of the catch gate.
Figure 10:
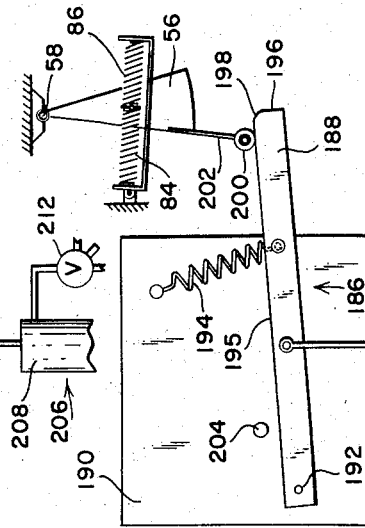
FIGURE 10 is a view similar to FIGURE 8, but showing the parts of the mechanism in an intermediate position between the opened and closed positions of the catch gate.

As gate 56 swings towards its mid-position shown in FIGURE 10, roller 200 rides along top face 195 towards end face 196. By moving gate 56 through its mid-position and to its cutoff position shown in FIGURE 11, roller 200 rides off the end of latch 188, permitting spring 194 to swing latch 188 upwardly into engagement with stop 204. As a result, roller 200 is urged by spring 86, which is now compressed, into engagement with end face 196 preventing gate 56 from swinging back toward its opened position.

To open gate 56, valve 212 is actuated to apply fluid pressure for swinging latch 188 downwardly, permitting roller 200 to ride up and onto top face 195.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a combination with a material transferring apparatus having a pivotally mounted catch gate swingable from a static opened position permitting material to flow in a continuously descending stream to a static closed, cutoff position for interrupting flow of material in said descending stream, a mechanism for swinging said gate from said opened position to said cutoff position, said mechanism including means harmonically controlling the motion of said gate when swinging from said opened position to said cutoff position by impressing accelerating and de-accelerating forces to impart to said gate a velocity that continuously increases as the gate swings from said opened position towards said cutoff position, reaches a maximum at an intermediate position substantially midway between said opened and cutoff position, and thereafter continuously decreases, becoming substantially zero when said gate reaches said cutoff position and means for holding said gate in said cutoff position.

2. The combination defined in claim 1 wherein the velocity pattern imparted to said gate by the forces applied by said mechanism is in the form of a half of a sine wave.

3. The combination defined in claim 1 wherein the accelerating and de-accelerating forces exerted by said motion-controlling means are substantially inversely proportional with respect to each other.

4. The combination defined in claim 1 wherein said mechanism comprises spring means connected to exert said accelerating and de-accelerating forces on said gate, the forces exerted by said spring means being opposed and becoming substantially equal when said gate reaches said intermediate position.

5. The combination defined in claim 4 wherein said spring means comprises a pair of oppositely acting springs each having a fixed end and an end operative connected to apply a biasing force to said gate, one of said springs being connected to exert said accelerating force and the other of said springs being connected to exert said de-accelerating force.

6. The combination defined in claim 5 wherein said springs are of like construction having the same spring constants.

7. The combination defined in claim 5 wherein said mechanism further comprises a piston slidably received in a cylinder, means for transmitting the motion of said piston to said gate, and means for displacing said piston to swing said gate from said cutoff position to said opened position, said springs being so disposed as to apply opposed forces on said piston.

8. The combination defined in claim 7 wherein said springs are of helically coiled construction and are coaxially mounted in said cylinder on opposite sides of said piston.

9. The combination defined in claim 7 comprising means for exerting pressure to introduce liquid into said cylinder on one predetermined side of said piston only during movement of said piston in a direction corresponding to movement of said gate toward said cutoff position to provide a cushion opposing reverse displacement of said piston by energy stored in the one of said springs exerting said de-accelerating force.

10. The combination defined in claim 7 wherein said means for transmitting motion of said piston comprises a toggle mechanism providing an over-center lock in each of said opened and cutoff positions.

11. The combination defined in claim 7 wherein said means for transmitting motion of said piston comprises a piston rod rigid with said piston, a pinion rack connected to said rod to move as a unit with said piston, a rotatably mounted pinion meshing with said rack, and a toggle link mechanism operatively connecting said pinion to said catch gate and providing an overcenter lock in each of said opened and cutoff positions.

12. The combination defined in claim 5 comprising a pivotally mounted member, resilient means biasing said member for pivotal displacement in a predetermined direction, stop means limiting pivotal displacement under the bias exerted by said resilient means, and means including a part engaging said member and being displaceable with said catch gate for pivoting said member in a direction opposing the bias exerted by said resilient means when said catch gate is swung from said opened position toward said cutoff position, said part cooperating with said member to release said member for pivotal displacement under the bias exerted by said resilient means when said catch gate reaches said cutoff position, said member and said part cooperating to releasably latch said catch gate in said cutoff position when said member is released by said part to pivot under the bias of said resilient means to a position engaging said stop means.

13. The combination defined in claim 12 wherein said part is rigid with said catch gate and wherein said member is pivotable about an axis extending parallel to the swing axis of said catch gate.

14. The combination defined in claim 13 wherein said part is displaceable along a first longitudinal surface of said member as said catch gate is swung toward said cutoff position and rides off an end of said member to engage the end face thereof when said gate reaches said cutoff position to allow said resilient means to urge said member toward said stop means.

15. In combination with a material transferring apparatus having means for delivering material in a continuous descending stream and a pivotally mounted catch gate swingable between a first feed position permitting material to flow in said descending stream and a second, cutoff position for interrupting the flow of material in said descending stream, the improvement of a mechanism for swinging said gate between said first and second positions and comprising a fluid motor cylinder, a piston slidable in said cylinder and dividing the interior thereof into axially spaced apart, expansible chambers, means for transmitting the sliding motion of said piston to swing said gate between said first and second positions, spring means operatively connected to resiliently urge said piston in a direction for swinging said catch gate from said first to said second position, means for introducing piston-displacing pressurized fluid into a predetermined one of said chambers for swinging said gate from said second to said first position and for storing energy in said spring means, means for applying pressure by introducing liquid into the other of said chambers only during movement of said piston in a gate closing direction, said liquid being introduced at a flow rate substantially only sufficiently to fill said other chamber as it expands by displacement of said piston by said spring means to provide a cushion opposing reverse displacement of said piston.

16. The comination defined in claim 15 comprising a reservoir for storing said liquid, flow passage means establishing fluid communication between said reservoir and said other chamber, and valve means so controlling flow of liquid through said passage means that liquid flows from said reservoir to said other chamber at a faster rate than the flow rate of liquid from said other chamber to said reservoir.

17. The combination defined in claim 16 wherein said passage means comprises a pair of branch passages connected in parallel relation between said reservoir and said other chamber, and wherein said valve means comprises a check valve disposed to control fluid flow through one of said passages and a control valve disposed to control fluid flow through the other of said passages, said check valve permitting fluid flow from said reservoir to said other chamber, but blocking flow of fluid from said other chamber to said reservoir.

18. In combination with a material transferring apparatus having means for delivering material in a continuous descending stream and a gate movable between a first position permitting material to flow in said descending stream and a second position for cutting off the flow of material in said descending stream, the improvement of a mechanism for moving said gate between said first and second position and comprising a fluid motor cylinder, a piston slidable in said cylinder and dividing the interior thereof into axially spaced apart, expansible chambers, means for transmitting the sliding motion of said piston to move said gate between said first and second positions, spring means operatively connected to resiliently urge said piston in a direction for moving said gate from said first to said second position, a first fluid reservoir for storing pressurized fluid, first fluid flow passage means establishing fluid communication between said first fluid reservoir and one of said chambers, first valve means disposed in said first fluid flow passage means and being operable to control delivery and exhaust of pressurized fluid with respect to said one chamber, said piston being displaceable by delivery of pressurized fluid to said one chamber to move said gate from said second to said first position and for storing energy in said spring means, a second fluid reservoir for storing liquid, second fluid flow passage means establishing fluid communication between said second reservoir and the other of said chambers, second valve means so controlling flow of liquid through said second fluid flow passage means that liquid flows from said second reservoir to said other chamber at a faster rate than the flow rate of liquid from said other chamber to said reservoir, third fluid flow conduit means establishing fluid communication between said first reservoir and said second reservoir, said first valve means being operable to admit pressurized fluid from said first reservoir into said second reservoir when positioned to exhaust fluid from said one chamber for allowing said spring means to move said gate from said first to said second position, the pressurized fluid introduced into said second reservoir acting on the liquid therein to force it into said other chamber with sufficient pressure only to fill said other chamber as it expands by movement of said piston in a direction for moving said gate from said first to said second position.

19. The combination defined in claim 3 comprising a scale for receiving the material descending in said stream and means providing for the delivery of said material, said catch gate being disposed between said scale and said delivery means for controlling the delivery of the material descending into said scale.

References Cited

UNITED STATES PATENTS

| | | | |
|---|---|---|---|
| 3,099,289 | 7/1963 | Neilson et al. | 92—131 X |
| 3,252,531 | 5/1966 | Mayer et al. | 177—184 X |

RICHARD B. WILKINSON, *Primary Examiner.*

G. H. MILLER, JR., *Assistant Examiner.*